(12) United States Patent
Bastioli et al.

(10) Patent No.: US 10,774,197 B2
(45) Date of Patent: Sep. 15, 2020

(54) PHOTODEGRADATION-RESISTANT BIODEGRADABLE FILMS

(71) Applicants: Novamont S.p.A., Novara (IT); Consiglio Nazionale delle Ricerche, Rome (IT)

(72) Inventors: Catia Bastioli, Novara (IT); Luigi Capuzzi, Novara (IT); Claudio Russo, Novara (IT); Tommaso Martinelli, Florence (IT)

(73) Assignees: Novamont S.p.A., Novara (IT); Consiglio Nazionale delle Richerche, Rome (IT)

( * ) Notice: Subject to any disclaimer, the term of this patent is extended or adjusted under 35 U.S.C. 154(b) by 0 days.

(21) Appl. No.: 14/434,165

(22) PCT Filed: Oct. 9, 2013

(86) PCT No.: PCT/EP2013/071089
§ 371 (c)(1),
(2) Date: Apr. 8, 2015

(87) PCT Pub. No.: WO2014/057001
PCT Pub. Date: Apr. 17, 2014

(65) Prior Publication Data
US 2015/0267037 A1 Sep. 24, 2015

(30) Foreign Application Priority Data

Oct. 10, 2012 (IT) .............. MI2012A1703

(51) Int. Cl.
| C08K 5/15 | (2006.01) |
| C08J 5/18 | (2006.01) |
| C08K 5/13 | (2006.01) |
| C08L 67/02 | (2006.01) |
| C08L 101/16 | (2006.01) |

(52) U.S. Cl.
CPC .............. *C08K 5/15* (2013.01); *C08J 5/18* (2013.01); *C08K 5/13* (2013.01); *C08L 67/02* (2013.01); *C08J 2300/16* (2013.01); *C08J 2367/02* (2013.01); *C08L 101/16* (2013.01)

(58) Field of Classification Search
None
See application file for complete search history.

(56) References Cited

U.S. PATENT DOCUMENTS

| 6,596,788 | B2 | 7/2003 | Kawamura et al. | |
| 2002/0002252 | A1* | 1/2002 | Obuchi | C08K 5/20 525/450 |
| 2003/0143256 | A1 | 7/2003 | Gen | |
| 2008/0048365 | A1 | 2/2008 | Yao | |
| 2011/0275749 | A1* | 11/2011 | Uyama | C08G 63/08 524/291 |
| 2015/0217896 | A1* | 8/2015 | Byun | B65D 1/40 428/36.92 |

FOREIGN PATENT DOCUMENTS

| EP | 1591216 A1 | 11/2005 |
| WO | WO-2011/147806 A1 | 12/2011 |
| WO | WO 2011/147806 A1 * | 12/2011 |

OTHER PUBLICATIONS

Dunnick et al. Toxicologic Pathology, 39: 398-409, 2011.*

* cited by examiner

*Primary Examiner* — Robert T Butcher
(74) *Attorney, Agent, or Firm* — Polsinelli PC

(57) ABSTRACT

This invention relates to biodegradable films characterised by high resistance to processes of the photodegradative type, mainly activated by the ultraviolet component of sunlight, which are particularly suitable for use in the mulch film sector. These films comprise a composition containing at least one polyphenol of plant origin.

8 Claims, No Drawings

PHOTODEGRADATION-RESISTANT BIODEGRADABLE FILMS

CROSS REFERENCE TO RELATED APPLICATIONS

This application is a National Phase filing under 35 U.S.C. § 371 of PCT/EP2013/071089 filed on Oct. 9, 2013; and this application claims priority to Application No. MI2012A001703 filed in Italy on Oct. 10, 2012. The entire contents of each application are hereby incorporated by reference.

DESCRIPTION

This invention relates to biodegradable films characterised by high resistance to processes of a photodegradative type mainly activated by the ultraviolet component of sunlight, which are particularly suitable for use in the sector of mulching films.

Mulching is an operation performed in agriculture which comprises covering the ground with a protective layer to prevent for example the growth of weeds, to retain moisture, to limit erosion and to raise the temperature of the soil.

In this sector the use of plastic films (known as mulch films), which have many advantages, such as for example a great reduction in water consumption, earlier harvesting, reduced wash-out of fertilisers and less compaction of the soil, which is therefore better aerated, has been widespread for a long time.

More recently the use of biodegradable mulch films which by degrading under the action of microorganisms present in the ground have the further advantage that they do not have to be removed at the end of the cultivation cycle, are becoming more widespread.

In some applications mulch films comprise pigments, mainly black in colour, to improve the screening protective effect. In other types of use, transparent films are for example used when the effect of bringing a crop on early is particularly desired.

In all cases, in order to be used effectively, these films must be capable of demonstrating properties of high resistance to the ultraviolet light present in solar radiation, without undergoing rapid photodegradative phenomena such as for example embrittlement or disintegration.

Synthetic UV stabilisers that are capable of slowing down the abovementioned photodegradative processes are known in commerce and the literature. However, their use in biodegradable mulch films has the disadvantage that it results in their accumulation in the ground following biodegradation of the films.

The problem underlying this invention is therefore that of obtaining a biodegradable film characterised by the property of sufficiently high resistance to ultraviolet light for use in the production of mulch films.

Starting from this problem, it has now been surprisingly found that there is a category of polyphenols of plant origin which is capable of effectively preventing or slowing the degradative effects of ultraviolet light on the properties of films manufactured using aliphatic and aliphatic-aromatic polyesters.

In particular this invention relates to a film comprising a composition containing at least one thermoplastic polyester selected from aliphatic and aliphatic-aromatic polyesters, and 0.1-10%, preferably from 0.2 to 8%, even more preferably 0.5-4% by weight, of at least one polyphenol selected from silibin, silidianin, isosilibin and silicristin, and mixtures thereof. These polyphenols are naturally contained, for example, in the milk thistle (*Silybum marianum*) seeds.

In a preferred embodiment the above mentioned polyphenols (silibin, silidianin, isosilibin and silicristin) are used as a mixture in the composition according to the invention. Such a mixture may be easily obtained for example by alcoholic extraction of the deoiled cake from milk thistle (*Silybum marianum*) seeds and is commonly also known commercially by the name of Silymarin. Silymarin-based preparations are for example used in the nutritional supplement and herbal sectors.

The composition according to this invention may comprise, in addition to the polyphenols listed above (silibin, silidianin, isosilibin and silicristin), up to 10% by weight of lignin. Lignin is an organic polymer mainly comprising phenol compounds which in nature is mainly present in the cell walls of some plant species. Lignin is mainly obtained by extraction from cellulose pulp in the process of paper production. The physical and chemical properties of lignin may vary according to the extraction technology used and the plant material from which it is extracted.

As far as the lignin is concerned, all lignins, for example softwood lignin and hardwood lignin such as lignin from pinewood, oak, poplar, pine, or lignin from straw or similar materials, can be used in this invention.

In the compositions according to this invention the lignin may also be present in the form of sulphate-lignin (or Kraft lignin), sulphonate-lignin (or lignin sulphonate or ligninsulphonate), organosolv lignin, lignin treated by pressurised steam (steam explosion), lignin treated with acid, lignin treated with bases, lignin having functional groups such as for example alkoxylated, ethoxylated, phenoxylated, carboxylated or acylated lignin, and mixtures thereof. Organosolv lignins are particularly preferred.

As far as alkoxylated lignin is concerned, this may preferably have an alkoxides content of ≤2 mmol/g, more preferably ≤1.4 mmol/g, even more preferably ≤1.2 mmol/g, even more preferably ≤1 mmol/g, even more preferably 0.8 mmol/g, even more preferably 0.7 mmol/g, even more preferably 0.6 mmol/g, even more preferably 0.5 mmol/g, even more preferably 0.4 mmol/g, and even more preferably 0.3 mmol/g.

The alkoxides content of the lignin may be ≥0.001 mmol/g, ≥0.01 mmol/g, ≥0.05 mmol/g, ≥0.1 mmol/g.

As far as ethoxylated lignin is concerned, this may preferably have an ethoxides content of ≤2 mmol/g, more preferably ≤1.4 mmol/g, even more preferably ≤1.2 mmol/g, even more preferably ≤1 mmol/g, even more preferably 0.8 mmol/g, even more preferably 0.7 mmol/g, even more preferably 0.6 mmol/g, even more preferably 0.5 mmol/g, even more preferably 0.4 mmol/g, and even more preferably 0.3 mmol/g.

The ethoxides content of the lignin may also be ≥0.001 mmol/g, ≥0.01 mmol/g, ≥0.05 mmol/g, ≥0.1 mmol/g.

As far as phenoxylated lignin is concerned, this may preferably have a phenoxides content of between 2 mmol/g and 8 mmol/g, more preferably between 2.5 mmol/g and 7 mmol/g, even more preferably between 3 mmol/g and 6 mmol/g.

The alkoxides, ethoxides and phenoxides content can easily be determined by analytical techniques such as for example $^{13}C$ NMR, as for example described in patent applications WO 2012/135806 and WO 2012/135807.

In a particularly preferred embodiment the lignin will have a number average molecular weight Mn of 200-3000 g/mol, preferably 350-2000 g/mol, more preferably 500 g/mol-1500 g/mol.

It has in fact been surprisingly found that lignins having the abovementioned number average molecular weights are more effectively dispersible in the composition according to this invention, thus making it possible to obtain films characterised by higher elongation on failure values in comparison with films comprising compositions containing higher molecular weight lignin.

As far as the weight average molecular weight of the lignin is concerned, this is advantageously between 500 g/mol and 5000 g/mol, preferably between 750 g/mol and 4000 g/mol, more preferably between 900 g/mol and 3500 g/mol.

As far as the molecular weight polydispersity index Mw/Mn is concerned, this is instead preferably between 1 and 5, more preferably between 1.2 and 4, even more preferably between 1.3 and 3.5, and even more preferably between 1.4 and 3.

With regard to the composition according to this invention, the aliphatic thermoplastic polyesters comprise an aliphatic dicarboxylic component and an aliphatic diol component, while the aliphatic-aromatic thermoplastic polyesters have a dicarboxylic component comprising multifunctional aromatic acids and aliphatic diacids and an aliphatic diol component.

Preferably the dicarboxylic component of the aliphatic polyesters comprises at least one saturated aliphatic diacid advantageously selected from oxalic acid, malonic acid, succinic acid, glutaric acid, 2-methylglutaric acid, adipic acid, pimelic acid, suberic acid, azelaic acid, sebacic acid, undecandioic acid, dodecandioic acid or brassylic acid. Of these, adipic acid, succinic acid, sebacic acid, azelaic acid, undecandioic acid, dodecandioic acid and brassylic acid are preferred. In a particularly preferred embodiment the dicarboxylic component of the aliphatic polyesters comprises diacids obtained from raw materials of renewable origin, thus contributing to reducing the utilisation of non-renewable resources such as for example raw materials of fossil origin.

In the meaning of this invention products are to be regarded as being of renewable origin when obtained from sources which, on account of their intrinsic characteristics, are regenerated in nature and cannot be exhausted within the scale of a human lifetime and, by extension, those whose use does not prejudice natural resources for future generations. The use of products of renewable origin also contributes to reducing atmospheric $CO_2$ and reducing the use of non-renewable resources. A typical example of a renewable source is plant crops.

In a preferred embodiment the dicarboxylic component of the polyesters of the aliphatic type comprises at least 20% by moles with respect to the total moles of the dicarboxylic component of a first saturated aliphatic diacid selected from succinic acid, azelaic acid, sebacic acid, brassylic acid and mixtures thereof and up to 80% by moles with respect to the total moles of the aliphatic dicarboxylic component of a second saturated aliphatic diacid selected from oxalic acid, malonic acid, glutaric acid, 2-methylglutaric acid, adipic acid, pimelic acid, suberic acid, undecandioic acid, dodecandioic acid, and mixtures thereof.

The dicarboxylic component of the aliphatic polyesters may also advantageously contain up to 10% in moles with respect to the total moles of the dicarboxylic component of diacids having an unsaturation in the chain, such as for example itaconic acid and maleic acid.

As far as the polyesters of the aliphatic-aromatic type are concerned, the multifunctional aromatic acids are advantageously selected from dicarboxylic aromatic compounds of the type of phthalic acid and its esters, preferably terephthalic acid, and heterocyclic dicarboxylic aromatic compounds and their esters, preferably 2,5 furan dicarboxylic acid. In a particularly preferred embodiment these heterocyclic dicarboxylic aromatic compounds are obtained from raw materials of renewable origin, thus contributing to reducing the use of non-renewable resources such as for example raw materials of fossil origin.

As far as the polyesters of the aliphatic-aromatic type are concerned, these are preferably characterised by a content of multifunctional aromatic acids of between 30 and 90% in moles, preferably between 35 and 85% by moles with respect to the total moles of dicarboxylic component.

Preferably the aliphatic-aromatic polyesters may be advantageously selected from:
(A) polyesters comprising repeating units deriving from aromatic acids of the phthalic acid, aliphatic diacids and aliphatic diol (AAPE-A), characterised by an aromatic units content of between 35 and 60% in moles, preferably between 40 and 55% by moles with respect to the total moles of the dicarboxylic component;
(B) polyesters comprising repeated units deriving from heterocyclic dicarboxylic aromatic compounds, aliphatic diacids and aliphatic diols (AAPE-B), characterised by an aromatic units content of between 50 and 85% by moles, preferably between 60 and 75% by moles with respect to the total moles of the dicarboxylic component.

Particularly preferred are also aliphatic-aromatic polyesters in which the multifunctional aromatic acids comprise mixtures of dicarboxylic aromatic compounds of the phthalic acid type and heterocyclic dicarboxylic aromatic compounds in which the heterocyclic dicarboxylic aromatic compounds preferably comprise 1-99%, preferably 5-95%, and more preferably 20-90% by moles with respect to the total moles of aromatic acids having multiple functional groups.

Preferably the aliphatic dicarboxylic component of the polyesters of the aliphatic-aromatic type comprises at least one saturated aliphatic diacid advantageously selected from oxalic acid, malonic acid, succinic acid, glutaric acid, 2-methylglutaric acid, adipic acid, pimelic acid, suberic acid, azelaic acid, sebacic acid, undecandioic acid, dodecandioic acid or brassylic acid. Of these, adipic acid, succinic acid, sebacic acid, azelaic acid, undecandioic acid, dodecandioic acid and brassilic acid are preferred.

In a preferred embodiment the aliphatic dicarboxylic component of the aliphatic-aromatic type comprises at least 20% by moles with respect to the total moles of the aliphatic dicarboxylic component of a first saturated aliphatic diacid selected from succinic acid, adipic acid, azelaic acid, sebacic acid, brassilic acid and mixtures thereof and up to 80% by moles with respect to the total moles of the aliphatic dicarboxylic component of a second saturated aliphatic diacid selected from oxalic acid, malonic acid, glutaric acid, 2-methylglutaric acid, pimelic acid, suberic acid, undecandioic acid, dodecandioic acid, and mixtures thereof.

In a particularly preferred embodiment the dicarboxylic component of the aliphatic-aromatic polyesters comprises aliphatic diacids obtained from raw materials of renewable origin, thus contributing to reducing the use of non-renewable resources such as for example raw materials of fossil origin.

The dicarboxylic component of the second aliphatic-aromatic polyesters may also advantageously contain 10% by moles with respect to the total moles of the dicarboxylic component of diacids having an unsaturation in the chain such as for example itaconic acid and maleic acid.

As far as the diol component of the aliphatic and aliphatic-aromatic thermoplastic polyesters is concerned, this comprises at least one dihydroxyl compound selected from alkane diols having the formula $C_nH_{2n}(OH)_2$ in which "n" is between 2 and 14, $C_5$-$C_{10}$ cycloalkandiols, diols comprising heterocyclic rings and their mixtures. Advantageously, this hydroxyl compound is selected from 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,14-cyclohexandimethanol, neopentylglycol, 2-methyl-1,3-propandiol, di anhydrosorbitol, dianhydromannitol, dianhydroititol, cyclohexandiol and their mixtures. Of these, 1,4-butandiol, 1,3-propandiol and 1,2-ethandiol and their mixtures are particularly preferred. In a preferred embodiment, the diol component comprises at least 85% by moles with respect to the total moles of the diol component of 1,4-butandiol.

Typical examples of aliphatic-aromatic polyesters suitable to be used in the composition according to the invention are copolyesters of the type poly(butylene adipate-co-butylene terephthalate), poly(butylene sebacate-co-butylene terephthalate), poly(butylene azelate-co-butylene terephthalate), poly(butylene brassylate-co-butylene terephthalate), poly(butylene succinate-co-butylene terephthalate), poly(butylene adipate-co-butylene sebacate-co-butylene terephthalate), poly(butylene azelate-co-butylene sebacate-co-butylene terephthalate), poly(butylene adipate-co-butylene azelate-co-butylene terephthalate), poly(butylene succinate-co-butylene sebacate-co-butylene terephthalate), poly(butylene adipate-co-butylene succinate-co-butylene terephthalate). poly(butylene azelate-co-butylene succinate-co-butylene terephthalate).

The aliphatic and aliphatic-aromatic thermoplastic polyesters may also comprise repetitive units deriving from at least one hydroxyacid in a quantity of between 0 and 49%, preferably between 0 and 30% by moles with respect to the total moles of the dicarboxylic component. Examples of suitable hydroxyacids are glycolic, hydroxybutyric, hydroxycaproic, hydroxyvaleric, 7-hydroxyheptanoic, 8-hydroxycaproic, 9-hydroxynonanoic and lactic acids or lactides. The hydroxyacids may be inserted into the chain as such, or may also be first caused to react with diacids or diols.

Long molecules having two functional groups, including those with functional groups not in the terminal position, may also be added in a quantity not exceeding 10% by moles with respect to the total moles of the dicarboxylic component. Examples are acid dimers, ricinoleic acid and acids having epoxy functional groups, and also polyoxyethylenes having a molecular weight of between 200 and 10,000.

Diamines, amino acids, amino alcohols may also be present in percentages up to 30% by moles with respect to the total moles of the dicarboxylic component.

One or more molecules having multiple functional groups may also advantageously be added in the process of preparing the aliphatic and aliphatic-aromatic thermoplastic polyesters, in quantities of between 0.1 and 3% by moles with respect to the total moles of the dicarboxylic component (and any hydroxyacids) in order to obtain branched products. Examples of these molecules are glycerol, pentaerythritol, trimethylolpropane, citric acid, dipentaerythritol, monoanhydrosorbitol, monohydromannitol, acid triglycerides, polyglycerols, etc.

The molecular weight $M_n$ of the aliphatic and aliphatic-aromatic thermoplastic polyesters is generally greater than 30,000. As far as the polydispersity index of the molecular weights Mw/Mn is concerned, this is instead typically comprised between 1.5 and 10, preferably between 1.6 and 5 and more preferably between 1.8 and 2.5.

The molecular weights $M_n$ and $M_w$ may be measured by Gel Permeation Chromatography (GPC). The determination may be performed with the chromatography system held at 40° C., using a set of three columns in series (particle diameter 5µ and corresponding porosities of 500 A, 1000 A and 10,000 A), a refractive index detector, chloroform as eluent (flow 1 ml/min) and using polystyrene as the reference standard.

The Melt Flow Rate (MFR) of the aliphatic and aliphatic-aromatic thermoplastic polyesters is preferably between 500 and 1 g/10 min, more preferably between 100 and 5 g/10 min, even more preferably between 70 and 10 g/10 min (measurements made at 190° C./2.15 kg according to standard ASTM D1238-89 "Standard Test Method for Melt Flow Rates of Thermoplastics by Extrusion Plastometer").

Preferably, the aliphatic and aliphatic-aromatic thermoplastic polyesters have an inherent viscosity (measured using an Ubbelohde viscosity meter for solutions in $CHCl_3$ having a concentration of 0.2 g/dl at 25° C.) of more than 0.4, preferably between 0.4 and 2, more preferably between 0.7 and 1.5 dl/g.

The aliphatic and aliphatic-aromatic thermoplastic polyesters may be prepared according to any of the known processes in the state of the art. Advantageously they are obtained by a polycondensation reaction. Advantageously, the process of polymerising the polyesters may be performed in the presence of a suitable catalyst. Among such suitable catalysts may for example be mentioned organometallic compounds of tin, for example stannoic acid derivatives, titanium compounds, for example orthobutyltitanate, aluminium compounds, for example Al-triisopropyl, and compounds of antimony and zinc.

The aliphatic and aliphatic-aromatic thermoplastic polyesters may also be obtained by means of a reactive extrusion process from a precursor polyester (PP) comprising repetitive units mainly formed of a dicarboxylic component and a substantially linear diol component having an MFI of 5-30 dl/g at 190° C. and 2.16 kg, having a weight average molecular weight $M_w$, measured by GPC of between 60,000 and 120,000 and a content of active sites such as unsaturations in a quantity of 0.1-1% in moles and/or terminal acid groups in a quantity of 10-200 meq of KOH, this reactive extrusion process being carried out through the addition of a compound selected from peroxides, epoxides or carbodiimides such as those described below. When the reactive extrusion process is performed using peroxides, these are used in quantities of 0.001-0.2% and preferably 0.01-0.1% by weight with respect to the sum of the polymers fed to the reactive extrusion process.

As far as the addition of epoxides is concerned, these are preferably used in a quantity of 0.1-2%, more preferably 0.2-1% by weight with respect to the sum of the polymers fed to the reactive extrusion process.

When carbodiimides are used, these are preferably used in a quantity of 0.05-2%, more preferably 0.1-1% by weight with respect to the sum of the polymers fed to the reactive extrusion process.

Mixtures of these peroxides, epoxides and carbodiimides may be used.

Preferably the precursor polyester PP has an MFI of 5-30 and more preferably 7-20 g/10 min at 190° C. and 2.16 kg, a shear viscosity of 400-900 Pas and a weight average molecular weight Mw of preferably between 100,000 and 130,000.

Preferably, this precursor polyester PP has an unsaturations content of 0.1-0.8% and more preferably 0.2-0.7% by moles with respect to the moles of repeated units of the precursor polyester PP.

The unsaturations may be generated in situ in the polymerisation stage or in processing of the precursor polyester PP or through the insertion of suitable unsaturated monomers or unsaturated chain terminations.

Particularly preferred are precursor polyesters PP having terminal unsaturations.

Among unsaturated chain terminations, those preferred are those having the following structure:

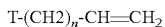

T-(CH2)$_n$-CH=CH$_2$ in which "T" is a group capable of reacting with carboxylic and/or hydroxyl groups, for example a hydroxyl, carboxyl, amine, amide or ester group, and "n" is a whole number of between 0 and 13.

These unsaturated chain terminations may also be used as a mixture.

As far as "T" is concerned, this is preferably a hydroxyl or a carboxyl group.

The whole number "n" is preferably between 1 and 13, more preferably between 3 and 13 and even more preferably 8 or 9.

Particularly preferred compounds having unsaturated chain terminations are omega-undecenoic acid, omega-undecenyl alcohol and their mixtures.

The presence of unsaturations and/or adducts deriving from the reactions between these following reactive extrusion may be determined by various methods well known to those skilled in the art such as NMR spectroscopy or by methanolysis reactions of the polymer chain coupled with chromatographic methods combined with mass spectrometry.

Those skilled in the art will easily be able to identify the structures referring to either unsaturations as such or adducts deriving from the reaction of these following reactive extrusion.

As far as measurement of the unsaturations content by NMR is concerned, this may be performed by 300 MHz H1 NMR using a pulse-acquisition sequence characterised by a pulse phase of 30°, a spectral amplitude=4 kHz, a delay of 5 seconds and performing 6000 scans.

Preferably, the aliphatic and aliphatic-aromatic thermoplastic polyesters can be obtained by a reactive extrusion process from a precursor polyester PP having a terminal acid groups content of 35-150 meq of KOH/kg of polyester.

The terminal acid groups content may be measured in the following way: 1.5-3 g of polyester are placed in a 100 ml beaker together with 60 ml of chloroform. After the polyester has completely dissolved 25 ml of 2-propanol are added, and, immediately prior to analysis, 1 ml of deionised water. The solution so obtained is titrated against a previously standardised solution of KOH in ethanol. An appropriate indicator, such as for example a glass electrode for acid-base titrations in non-aqueous solvents is used to determine the endpoint of the titration. The terminal acids group content is calculated on the basis of the consumption of the KOH in ethanol solution using the following equation:

Terminal acid groups content (meq $KOH$/kg polymer) =
$$\frac{\lfloor(V_{eq} - V_b) \cdot T\rfloor \cdot 1000}{P}$$

in which: $V_{eq}$=ml of KOH solution in ethanol at the endpoint of the titration of the sample;

$V_b$=ml of KOH solution in ethanol necessary to achieve a pH=9.5 in the blank titration;

T=concentration of the KOH in ethanol solution expressed in moles/litre;

P=weight of the sample in grams.

The process of producing the precursor polyester PP may take place according to the process for preparing polyesters described above.

Preferably, the aliphatic and aliphatic-aromatic thermoplastic polyesters are biodegradable. In the meaning of this invention, by biodegradable polymers are meant biodegradable polymers according to standard EN 13432.

In addition to the aliphatic and aliphatic-aromatic thermoplastic polyesters, the composition according to this invention preferably comprises one or more polymers of synthetic or natural origin, which may or may not be biodegradable.

In particular, the aliphatic and aliphatic-aromatic thermoplastic polyesters may be used in a mixture with hydroxy-acid polyesters or polyesters of the polyester-ether type.

Of the polyesters from hydroxyacid, those preferred are: poly-L-lactic acid, poly-D-lactic acid and poly-D-L-lactic acid stereo complex, poly-ε-caprolactone, poly-hydroxybutyrate, poly-hydroxybutyrate-valerate, poly-hydroxybutyrate propanoate, poly-hydroxybutyrate-hexanoate, poly-hydroxybutyrate-decanoate, poly-hydroxybutyrate-dodecanoate, poly-hydroxybutyrate-hexadecanoate, poly-hydroxybutyrate-octadecanoate and poly-3-hydroxybutyrate-4-hydroxybutyrate.

Preferably the composition according to this invention comprises up to 30% by weight of the hydroxy acids described above, more preferably up to 20% by weight with respect to the total weight of the polyester composition.

As far as polymers of natural origin are concerned, these are for example starch, cellulose, chitin, chitosan, alginates, proteins such as gluten, zein, casein, collagen, gelatine, natural gums, and their derivatives. The starches and celluloses may be modified and among these mention may be made for example of starch or cellulose esters having a level of substitution of between 0.2 and 2.5, hydroxypropylate starches, starches modified with fatty chains, cellophane. Compositions comprising starch are particularly preferred. The starch may also be used in destructured or gelatinised or filler form. The starch may constitute the continuous phase or the dispersed phase, and may be in a co-continuous form. In the case of dispersed starch, the starch is preferably in the form of particles having a circular or elliptical cross-section or a cross-section which can in any way be likened to an ellipse having a mean arithmetic diameter measured along the major axis of the particle which is less than 1 micron and more preferably less than 0.5 μm in average diameter.

Preferably the composition according to this invention comprises between 5 and 50% of the polymers of natural origin described above, more preferably between 5 and 40% by weight with respect to the total weight of the composition.

The composition according to this invention may also advantageously comprise up to 5% by weight with respect to the total weight of the composition of one or more synthetic polymers selected from polyolefins, aromatic polyesters, polyester- and polyether-urethanes, polyurethanes, polyamides, polyamino acids, polyethers, polyureas, polycarbonates and mixtures thereof.

Among the polyolefins, those preferred are: polyethylene, polypropylene, their copolymers, polyvinyl alcohol, polyvinyl acetate, polyethyl vinyl acetate and polyethylene vinyl alcohol.

Among the aromatic polyesters those preferred are PET, PBT, PTT in particular having a renewables content >30%, and polyalkylene furan dicarboxylates. Among the latter polyethylene furan dicarboxylate, polypropylene furan dicarboxylate, polybutylene furan dicarboxylate and their mixtures are particularly preferred.

Examples of polyamides are: polyamide 6 and 6.6, polyamide 9 and 9.9, polyamide 10 and 10.10, polyamide 11 and 11.11, polyamide 12 and 12.12 and their combinations of the 6/9, 6/10, 6/11 and 6/12 type.

The polycarbonates may be polyethylene carbonates, polypropylene carbonates, polybutylene carbonates, their mixtures and copolymers.

The polyethers may be polyethylene glycols, polypropylene glycols, polybutylene glycols, their copolymers and their mixtures having molecular weights from 70,000 to 500,000.

The composition according to this invention may also comprise additives such as for example plasticisers, organic and/or inorganic fillers, lubricants, nucleating agents, surfactants, antistatic agents, pigments, flame-retarding agents, cross-linking agents, and compatibilising agents. These additives are preferably added in quantities up to 10% by weight and more preferably between 2 and 6% by weight with respect to the total weight of the composition.

As far as fillers are concerned, these may be inorganic and/or organic. Examples of particularly preferred inorganic fillers are: talc, clay, silica, mica, kaolin, calcium carbonate and wollastonite. The fillers are preferably present up to 20% by weight with respect to the total weight of the composition.

The preferred organic fillers are those deriving from raw materials of renewable origin such as for example cellulose fibre.

The lubricants are preferably selected from esters and metal salts of fatty acids such as for example zinc stearate, calcium stearate, aluminium stearate and acetyl stearate. Preferably, the composition according to this invention comprises up to 1% by weight of lubricants, more preferably up to 0.5% by weight with respect to the total weight of the composition.

Examples of nucleating agents include the sodium salt of saccharin, calcium silicate, sodium benzoate, calcium titanate, boron nitride, isotactic polypropylene, low molecular weight PLA and PBT.

Pigments may also be added if necessary, for example titanium dioxide, clays, copper phthalocyanin, titanium dioxide, iron silicates, oxides and hydroxides, carbon black, and magnesium oxide. Up to 10% by weight of these additives will preferably be added.

The composition according to this invention may be transformed into film either by the bubble extrusion technique or by flat head extrusion. In the case of film-forming by bubble extrusion, the film thickness obtained is typically 6-200 microns.

Thanks to the property of improved stability to ultraviolet radiation, the film according to this invention may advantageously be used to manufacture mulch films. In fact, these films, which have properties of high resistance to the ultraviolet light present in solar radiation, are capable of effectively performing their action of protecting the soil without experiencing fast degradative phenomena such as for example embrittlement or disintegration.

Multilayers in which the composition according to the invention is laminated with other plastics films, or extruded onto other plastics substrates, such as those comprising PLA (polylactic acid), cellophane, cellulose acetate, starch acetate or destructured starch or containing modified and unmodified destructured starch are also an object of this invention.

The invention will now be illustrated by a few embodiments which are to be understood to be by way of example and not restricting the scope of the protection of this patent application.

EXAMPLES

TABLE 1 compositions in the examples

| Example | AAPE | MATER-BI ®<br>CF04P | POLYPHENOL |
|---|---|---|---|
| 1 (comparison) | 100 | — | — |
| 2 | 99 | — | 1 |
| 3 | 97 | — | 3 |
| 4 (comparison) | — | 100 | — |
| 5 | — | 100 | 3 |

Where not expressly indicated, the figures are expressed in parts.

AAPE=poly(butylene sebacate-r-butylene adipate-r-butylene terephthalate) (54% mol butylenes terephthalate units; 30% moles butylene sebacate units; 16% moles butylenes adipate units) having an MFR (190° C.; 2.16 kg)=7 g/10 min, Tm=130° C.±2° C.

MATER-BI® CF04P: biodegradable composition marketed by Novamont S.p.A (Italy) comprising aliphatic-aromatic copolyester, starch and plasticizers and having Tm (measured by DSC)=130° C., MER (ASTM D1238)=7 g/10 min at T=160° C. and 5 kg of weight, pycnometric density at 23° C.=1, 23 g/cm$^3$:

POLYPHENOL: Sylimarin containing 14% silicristin, 5% silidianin, 61% silibin, 15% isosilibin and 5% of other isomers (the percentages are calculated with respect to the area of the ion at m/z 481 measured using a mass spectrometer operating under the following conditions: ESI source, sheath gas flow 30, aux gas flow 5, sweep gas flow 0, capillary voltage—8 V/4 V (positive ions), capillary temp. 275° C., tube lens—70 V/40 V (positive ions), scanning: 100-1500 Da, collision (cid): 5 V).

The compositions of EXAMPLES 1-2-3 reported in Table 1 were fed to an OMC EBV 60/36 extruder having L/D=36 and a diameter of 60 mm with 9 heating zones.

The extrusion parameters were as follows:
RPM: 120
Throughput: 30 kg/hour
Thermal profile 60–145–170–180×4–155×2° C.

The compositions of EXAMPLES 4-5 reported in Table 1 were fed to an OMC EBV 60/36 extruder having L/D=36 and a diameter of 60 mm with 9 heating zones.

The extrusion parameters were as follows:
RPM: 120
Throughput: 30 kg/hour
Thermal profile 60–140–150–160–165×3–145×2° C.

All the examples (1-2-3-4-5) obtained were made into film on a Ghioldi KE40 machine of 40 mm, die gap=0.9 mm, to obtain film having a thickness of 20-25 μm. The film then underwent mechanical characterisation according to standard ASTM D882 (longitudinal direction—traction at 23° C. and 55% relative humidity and Vo=50 mm/min). The results are shown in Table 2. The mechanical characterisation was repeated on the films subjected to the radiation produced by 8 OSRAM ULTRA-VITALUX® UV lamps for different times in order to reproduce the equivalent of a solar spectrum. The results are shown in Tables 3-7 below.

TABLE 2

Mechanical characteristics of the film prior to exposure to the UV lamp

| Example | Thickness (μm) | $\sigma_b$ (MPa) | $e_b$ (%) | E (MPa) | $En_b$ (KJ/m$^2$) |
|---|---|---|---|---|---|
| 1 (comparison) | 20 | 53 | 353 | 118 | 6571 |
| 2 | 19 | 47.2 | 415 | 107 | 6553 |
| 3 | 22 | 47 | 403 | 100 | 6239 |
| 4 (comparison) | 19 | 26 | 399 | 205 | 3788 |
| 5 | 20 | 22 | 428 | 239 | 2536 |

TABLE 3

Film according to Example 1 (comparison): mechanical characteristics for different exposure times to the UV lamp

| Exposure time days | Thickness (μm) | $s_b$ (MPa) | Δ % with respect to initial value | $e_b$ (%) | Δ % with respect to initial value | E (MPa) | Δ % with respect to initial value | Enb (KJ/m$^2$) | Δ % with respect to initial value |
|---|---|---|---|---|---|---|---|---|---|
| 1 | 20 | 36.5 | −31 | 347 | −2 | 129 | +9 | 4267 | −35 |
| 2 | 19 | 28.4 | −46 | 257 | −27 | 130 | +10 | 2592 | −61 |
| 4 | 18 | 18.4 | −65 | 123 | −65 | 120 | +1 | 898 | −86 |
| 7 | 19 | 16 | −70 | 82 | −77 | 112 | −5 | 521 | −92 |
| 10 | 20 | 14.7 | −72 | 59 | −83 | 129 | +9 | 333 | −95 |

TABLE 4

Film according to Example 2: mechanical characteristics for different exposure times to the UV lamp

| Exposure time days | Thickness (μm) | $s_b$ (MPa) | Δ % with respect to initial value | $e_b$ (%) | Δ % with respect to initial value | E (MPa) | Δ % with respect to initial value | Enb (KJ/m$^2$) | Δ % with respect to initial value |
|---|---|---|---|---|---|---|---|---|---|
| 1 | 19 | 35 | −26 | 403 | −3 | 110 | +2 | 4769 | −27 |
| 2 | 22 | 29.6 | −37 | 394 | −5 | 106 | −1 | 4112 | −37 |
| 4 | 19 | 22 | −53 | 280 | −33 | 120 | +12 | 2483 | −62 |
| 7 | 18 | 17.8 | −62 | 136 | −67 | 106 | −1 | 927 | −86 |
| 10 | 19 | 16.4 | −65 | 121 | −71 | 102 | −4 | 769 | −88 |

TABLE 5

Film according to Example 3: mechanical characteristics for different exposure times to the UV lamp

| Exposure time days | Thickness (μm) | $s_b$ (MPa) | Δ % with respect to initial value | $e_b$ (%) | Δ % with respect to initial value | E (MPa) | Δ % with respect to initial value | Enb (KJ/m$^2$) | Δ % with respect to initial value |
|---|---|---|---|---|---|---|---|---|---|
| 1 | 21 | 39.8 | −15 | 396 | −2 | 117 | +17 | 5399 | −13 |
| 2 | 20 | 39 | −17 | 396 | −2 | 130 | +30 | 5396 | −14 |

TABLE 5-continued

Film according to Example 3: mechanical characteristics for different exposure times to the UV lamp

| Exposure time days | Thickness (μm) | $s_b$ (MPa) | Δ % with respect to initial value | $e_b$ (%) | Δ % with respect to initial value | E (MPa) | Δ % with respect to initial value | Enb (KJ/m$^2$) | Δ % with respect to initial value |
|---|---|---|---|---|---|---|---|---|---|
| 4 | 20 | 29.4 | −37 | 366 | −9 | 121 | +21 | 3910 | −37 |
| 7 | 21 | 26.1 | −44 | 310 | −23 | 131 | +21 | 3226 | −48 |
| 10 | 21 | 20.2 | −57 | 194 | −52 | 128 | +28 | 1669 | −73 |

TABLE 6

Film according to Example 4 (comparison): mechanical characteristics for different exposure times to the UV lamp

| Exposure time days | Thickness (μm) | $s_b$ (MPa) | Δ % with respect to initial value | $e_b$ (%) | Δ % with respect to initial value | E (MPa) | Δ % with respect to initial value | Enb (KJ/m$^2$) | Δ % with respect to initial value |
|---|---|---|---|---|---|---|---|---|---|
| 1 | 21 | 20 | −23 | 343 | −14 | 237 | +15 | 2543 | −33 |
| 2 | 21 | 17 | −35 | 247 | −38 | 233 | +13 | 1607 | −58 |
| 5 | 19 | 13 | −50 | 86 | −78 | 220 | +7 | 494 | −87 |
| 7 | 19 | 11 | −58 | 53 | −87 | 194 | −6 | 244 | −94 |
| 9 | 18 | 11 | −58 | 33 | −92 | 199 | −3 | 144 | −96 |

TABLE 7

Film according to Example 5: mechanical characteristics for different exposure times to the UV lamp

| Exposure time days | Thickness (μm) | $s_b$ (MPa) | Δ % with respect to initial value | $e_b$ (%) | Δ % with respect to initial value | E (MPa) | Δ % with respect to initial value | Enb (KJ/m$^2$) | Δ % with respect to initial value |
|---|---|---|---|---|---|---|---|---|---|
| 1 | 21 | 19 | −14 | 333 | −22 | 235 | −2 | 2426 | −31 |
| 2 | 22 | 17 | −23 | 279 | −35 | 240 | +0 | 1894 | −46 |
| 5 | 21 | 14 | −36 | 252 | −41 | 225 | −6 | 1283 | −64 |
| 7 | 20 | 14 | −36 | 206 | −52 | 254 | +6 | 1213 | −66 |
| 9 | 21 | 16 | −27 | 189 | −56 | 284 | +18 | 1262 | −64 |

After exposure to ultraviolet light, the films in Examples 2 and 3 and 5 according to the invention showed a smaller change in mechanical properties, in particular ultimate tensile strength, elongation on failure and breaking energy, thus revealing a resistance to photodegradative processes deriving from exposure to ultraviolet light which is significantly greater than respectively that of the film in comparison Example 1 and 4.

The invention claimed is:

1. A film comprising a composition containing at least one thermoplastic polyester and 0.5-4% by weight of a mixture of polyphenols comprising silybin, silydianin, isosilybin and silycristin, wherein the thermoplastic polyester is an aliphatic-aromatic polyester and has a dicarboxylic component comprising at least one aromatic acid having multiple functional groups in an amount of between 30 and 90% in moles with respect to the total moles of the dicarboxylic component selected from dicarboxylic aromatic compounds of phthalic acid and their esters and heterocyclic dicarboxylic aromatic compounds and their esters and at least one aliphatic diacid selected from oxalic acid, malonic acid, succinic acid, glutaric acid, 2-methylglutaric acid, adipic acid, pimelic acid, suberic acid, azelaic acid, sebacic acid, undecandioic acid, dodecandioic acid and brassilic acid and an aliphatic diol component comprising at least 85% by moles with respect to the total moles of the diol component of butanediol.

2. The film according to claim 1 in which the mixture comprising silybin, silydianin, isosilybin and silycristin is obtained by extraction from milk thistle seeds.

3. The film according to claim 1, in which the aromatic aliphatic polyester is selected from:
 (A) polyesters comprising repeated units deriving from at least one aromatic acid of phthalic acid, at least one aliphatic diacid and at least one aliphatic diol having an aromatic units content of between 35-60% in moles with respect to the total moles of the dicarboxylic component; or (B) polyesters comprising repeating units deriving from at least one heterocyclic dicarboxylic aromatic compound, at least one aliphatic diacid and at least one aliphatic diol, having an aromatic units content of between 50-85% in moles with respect to the total moles of the dicarboxylic component.

4. The film according to claim 1, in which the composition comprises one or more polymers of synthetic or natural origin.

5. A method for mulching which comprises applying a film according to claim 1 to an area of soil.

6. A mulch film comprising the film according to claim 1.

7. The film according to claim 1, wherein the composition further comprises one or more polymers of natural origin in an amount between 5 and 50% by weight based upon the total weight of the composition.

8. The film according to claim 1, wherein the composition comprises up to 30% by weight of polymers from a hydroxy-acid with respect to the total weight of the composition.

* * * * *